United States Patent
Batistic et al.

(10) Patent No.: US 6,289,272 B1
(45) Date of Patent: Sep. 11, 2001

(54) METHOD OF IMPROVING ABS CONTROL BEHAVIOUR ON CORNERING

(75) Inventors: Ivica Batistic, Frankfurt am Main; Holger Schmidt, Wettenberg, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/214,976

(22) PCT Filed: Apr. 26, 1997

(86) PCT No.: PCT/EP97/02176

§ 371 Date: Sep. 17, 1999

§ 102(e) Date: Sep. 17, 1999

(87) PCT Pub. No.: WO98/03382

PCT Pub. Date: Jan. 29, 1998

(30) Foreign Application Priority Data

Jul. 18, 1996 (DE) .............................................. 196 28 980

(51) Int. Cl.$^7$ ................................. G60T 8/64; G60T 8/84
(52) U.S. Cl. ............................. 701/72; 180/79; 180/140; 180/197; 303/102; 303/103; 303/100; 290/43; 128/725
(58) Field of Search ........................ 701/72, 76; 303/100, 303/95, 103

(56) References Cited

U.S. PATENT DOCUMENTS

| | | | |
|---|---|---|---|
| 5,270,933 | * 12/1993 | Fennel et al. ........................... | 701/76 |
| 5,312,169 | * 5/1994 | Buschmann ........................... | 303/100 |
| 5,415,468 | * 5/1995 | Latarnik et al. ..................... | 303/100 |
| 5,436,836 | * 7/1995 | Holtz et al. ............................. | 701/76 |
| 5,477,456 | * 12/1995 | Fennel et al. ........................... | 701/76 |
| 5,819,193 | * 10/1998 | Burgdorf et al. ...................... | 701/76 |

FOREIGN PATENT DOCUMENTS

| | | |
|---|---|---|
| 34 13 738 | 10/1985 | (DE) . |
| 37 26 998 | 2/1989 | (DE) . |
| 39 19 347 | 2/1990 | (DE) . |
| 41 12 284 | 10/1991 | (DE) . |
| 41 11 614 | 10/1992 | (DE) . |
| WO90/09301 | 8/1990 | (WO) . |

OTHER PUBLICATIONS

Search Report of the German Patent Office Relating to Parent German Patent Application 196 28 980.7.

* cited by examiner

Primary Examiner—William A. Cuchlinski, Jr.
Assistant Examiner—Tuan C To
(74) Attorney, Agent, or Firm—Rader, Fishman & Grauer PLL

(57) ABSTRACT

In a method of improving the control behavior of an ABS control system in corners, a special control mode or rather a corner control mode is put into operation instead of the standard control mode when a cornering situation is identified, said special control mode or corner control mode causing a reduction of the braking pressure on the front wheel and/or on the rear wheel on the inside of the curve. When, in the partial braking range, a threshold value (th) of a wheel speed difference is exceeded, which difference is the difference between the side sums formed from the speeds of the two wheels of one vehicle side there will be a braking pressure reduction on the front wheel and/or on the rear wheel on the inside of the curve until there is again a drop below the threshold value (th,$th_H$) and, additionally, below a hysteresis band (H). (FIG. 2)

5 Claims, 3 Drawing Sheets

METHOD OF IMPROVING ABS CONTROL BEHAVIOUR ON CORNERING

BACKGROUND OF THE INVENTION

This invention relates to a method of improving the control behavior of an ABS control system and more particularly for improving the steerability of the vehicle and the driving stability during cornering, wherein a vehicle reference speed is derived and criteria for identifying a cornering situation and the direction of cornering are obtained from the rotational behavior of the vehicle wheels wherein, instead of the standard control mode, a special control mode or rather a corner control mode comes into operation when a cornering situation is identified, said special control mode or corner control mode producing a reduction of the braking pressure on the front wheel and/or on the rear wheel on the inside of the curve.

In a cornering identification system, with a method of control of the type presently mentioned, the pressure relief of the wheels on the inside of the curve generates a yawing moment around the vertical axis of the vehicle which balances and stabilizes the cornering situation. With control coming on during a partial braking operation, the braking pressure on the wheels on the outside of the curve will be kept constant or will automatically increase due to the cut-off of any further build-up of braking pressure on the wheel or wheels on the inside of the curve.

From DE 34 13 738 C2 (P 5547) there is already known an anti-lock control system (ABS) with a cornering identification circuit likewise based on wheel slip measurement. For the purpose of identifying a cornering situation, the slip values of the wheels of one vehicle side are added up and compared with the slip sum of the wheels of the other vehicle side and a cornering identification signal will be generated as soon as the difference between the slip sums exceeds a predetermined limit value. Selection criteria such as "select low" or "select high" criteria, according to which the pressure variation is controlled in the individual braking pressure control channels of this brake system, and limit values for the coming-on of these selection criteria will be varied when a cornering situation is identified. In this way, control is to be adapted to the varying conditions during driving straight onwards and during cornering.

It is known from older DE 21 19 590 A1 to obtain a cornering identification signal by means of a transverse acceleration measuring device such as a mercury switch.

It is further already known to expand the functions of an ABS control system in that the system is used for improving the driving and braking stabilities in corners. This is done in that a stabilizing moment is generated around the vertical axis of the vehicle by means of a calculated deceleration of the build-up of the braking pressure on the wheels on the inside of the curve as compared with the braking pressure on the wheels on the outside of the curve during cornering and a partial braking operation, i.e. during a braking operation where ABS response threshold values are not reached ("Bremsanlage und Schlupf-Regelsystem der neuen 7er-Reihe von BMW", ATZ 97 (1995), pages 8–15; and "Bremsanlage und Schlupf-Regelungssysteme der neuen Baureihe 5 von BMW", ATZ 98 (1996), pages 188–194 ["Brake system and slip control system of BMW's new no. 7 line of models" {ATZ auto journal, 97 (1995), pages 8–15}; and "Brake system and slip control systems of BMW's new no. 5 line of models" {ATZ auto journal, 98 (1996), pages 188–194}]). With no steering angle sensor being used, the information on the current steering angle is derived from the transverse acceleration which, on its part, is calculated from the wheel sensor signals.

It is thus an object of the present invention to develop a method of the type referred to above which will provide a marked contribution to improving the driving behavior and stabilization, respectively, of the vehicle by means of reliable cornering identification and reaction to this situation.

SUMMARY OF THE INVENTION

It now has been found that this object can be achieved by the method, the particular feature of which consists in that, in the partial braking range, with a threshold value of a wheel speed difference being exceeded which difference is the difference between the wheel speed sums per side formed from the wheel speeds of the two wheels of one side of the vehicle, the braking pressure is reduced on the front wheel on the inside of the curve and/or on the rear wheel on the inside of the curve until there is a drop below the threshold value and below a hysteresis band.

Thus, according to this invention, the desired stabilization during cornering is achieved by a massive braking pressure reduction on the wheel on the inside of the curve, i.e. on the front wheel and/or on the rear wheel. This braking pressure reduction will come on when the aforementioned threshold value of the slip difference is exceeded and will be continued until there is a drop below the threshold value and below an additional tolerance band or hysteresis band.

It has proved especially beneficial to vary the threshold value of the wheel speed difference in dependence on the (reference) speed of the vehicle. In a preferred example of an embodiment, the threshold value decreased approximately linearly with the vehicle speed in a lower range of the vehicle speed while it increased linearly with the vehicle speed in a medium range of speed and, at last, passed over into an approximately constant value.

A value in the order of magnitude of approximately 2–6 k.p.h., in particular of 3–4 k.p.h., proved beneficial as hysteresis band.

Any further details and applications of this invention will become evident from the following description, reference being made to the accompanying Figures.

DETAILED DESCRIPTION OF THE DRAWINGS

The block diagram is schematically simplified as are the flow chart and the graph in order to illustrate what is essential in this invention.

Figure 1:
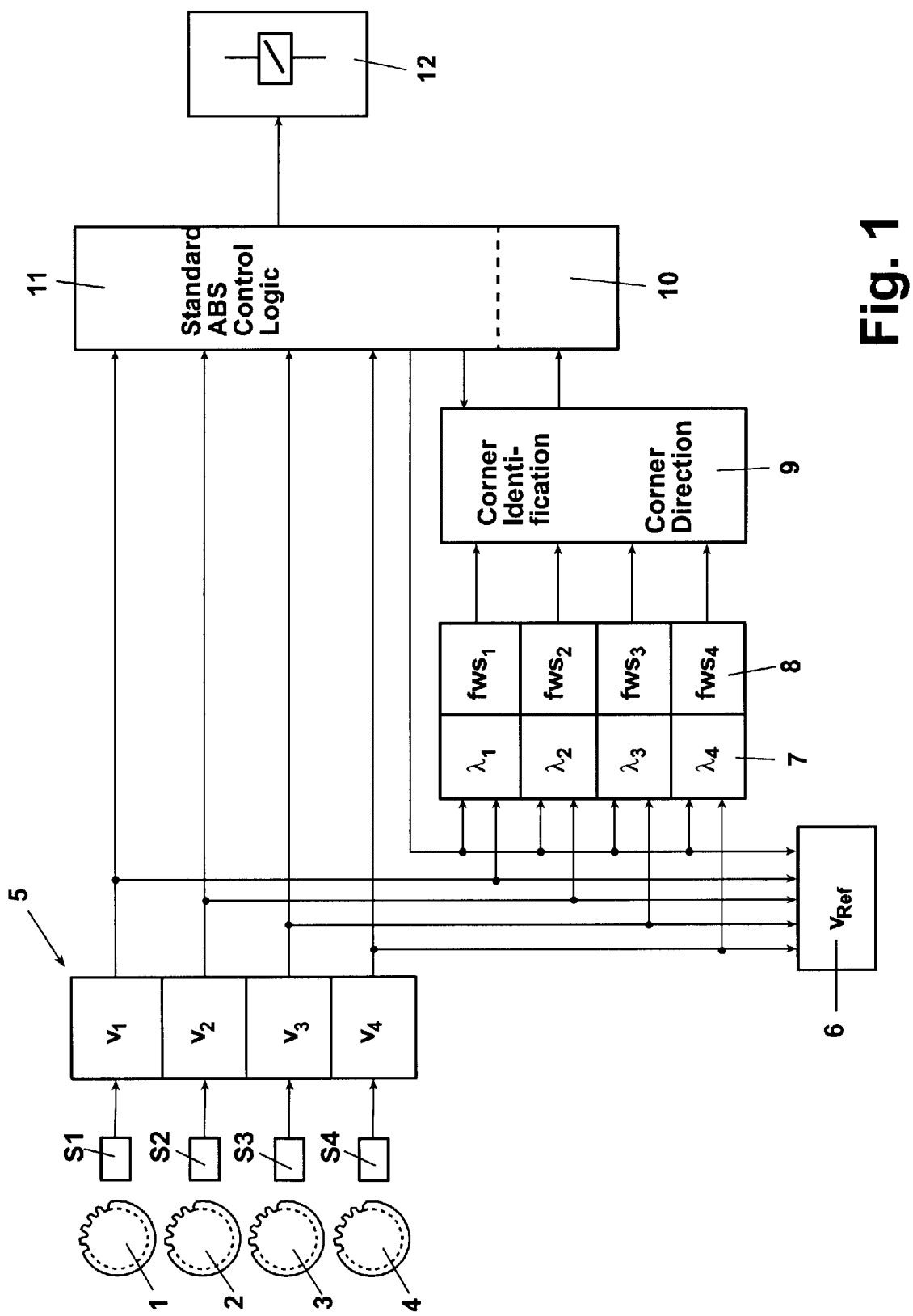
FIG. 1 is a block diagram of the essential electronic components or functional blocks of an ABS control system that is expanded for implementing the inventive method.

FIG. 1 represents the fundamental mode of operation of a circuit configuration for anti-lock control expanded by components for improving the control behavior during cornering.

The input information of the control system is obtained by means of wheel sensors S1 through S4. To this end, the individual (non-illustrated) vehicle wheels are equipped with transmitters or toothed disks 1–4 rotating with the vehicle wheels and generating an output signal in the transducers, i.e., the stationary components of sensors S1–S4. These output signals represent the rotational behavior of the individual wheels in a manner known per se.

After processing the sensor output signals in a circuit 5, there are available the wheel speed signals $V_1$–$V_4$. By means of logical combination of the output signals of circuit 5, namely of the speed signals $V_1$–$V_4$, in a linking circuit 6, a reference speed $V_{Ref}$ of the vehicle is formed which, above all, serves as a reference value for determining the wheel slip $8_1$ through $8_4$ of the individual vehicle wheels and, hence, also as a reference value for braking pressure modulation.

A circuitry block 7 contains the individual circuits for determining the wheel slip $8_1$ through $8_4$ by comparing the reference speed of the vehicle with the respective wheel speed $V_1$–$V_4$. As is known, the wheel slip results from the difference $$8_i = V_{Ref} - V_i, \text{ with } i=1\ldots 4.$$

With a program-controlled circuitry being used such as a microcomputer or microcontroller, block 7 symbolizes the program steps for calculating the slip $8_i$ of the individual vehicle wheels.

In a circuitry block 8, each slip signal passes a low-pass filter the filtering time constant of which may lie in the order of magnitude of 50–200 msecs; in our example the time constant lies at 70 msecs. The circuitry block 8 transmits a filtered wheel slip signal $fws_i$ and passes this output signal on to a curve identification circuit 9, respectively.

In the curve or cornering identification circuit 9, the current and the filtered wheel slip signals are analyzed and evaluated, with cornering identification taking place in accordance with qualitative and quantitative criteria. The direction of the curve is likewise determined by evaluating and logically combining the slip signals and the slip difference signals. The result of this slip evaluation by means of circuit 9 then leads to the adaptation of anti-lock control to the particular conditions of cornering, this being done via an additional circuit 10, namely a circuit in addition to the actual standard ABS control logic 11. Now, a special control or corner control will take place instead of standard control.

The output of the control logic 11 leads to the actuators or modulators 12 via non-represented processing and evaluating circuits, the braking pressure of a brake system being managed as required by means of these actuators or modulators 12. In the present-day anti-lock control systems, the actuators 12 used are mainly electromagnetically actuatable hydraulic valves for modulating and controlling the braking pressure in the individual wheel brakes.

Of course, the actual ABS control logic is likewise based on the evaluation of the processed wheel speed signals $v_1$–$V_4$, with the reference speed $V_{Ref}$ of the vehicle being taken into consideration.

Figure 2:
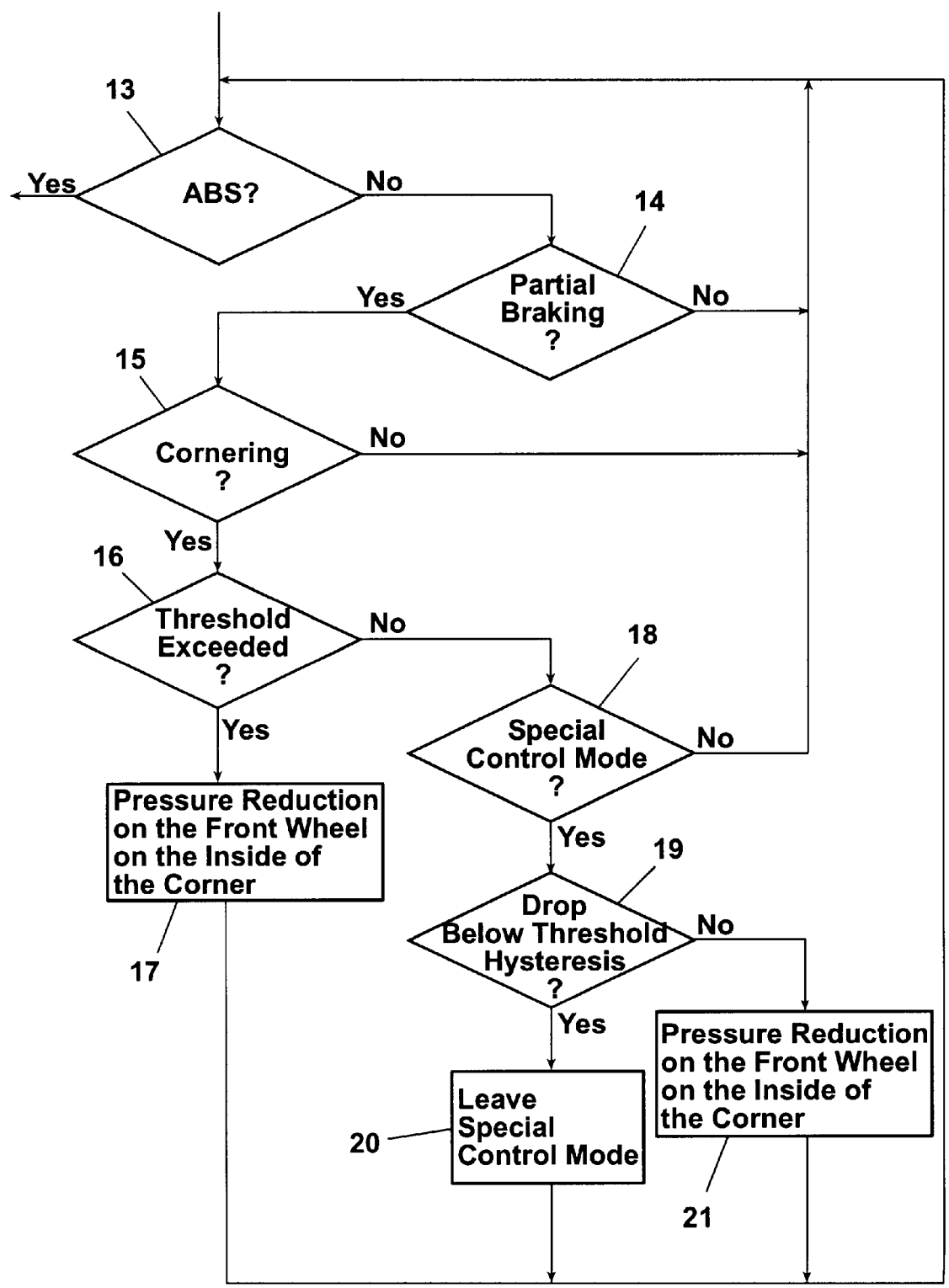
FIG. 2 is a flow chart of the individual steps of the program run or of the logical operations of the inventive method.

As already mentioned, the functions of a circuit configuration as per FIG. 1 can be realized by program-controlled circuits and by the program run, respectively. Nowadays, such controller technology is preferred. Therefore, in the form of a flow chart, FIG. 2 shows the program run which transforms the inventive method into control steps. These functions, steps and logical operations are mainly sited in the cornering identification circuit 9.

FIG. 2 shows a detail of an ABS control program.

The special program of this invention takes place in the partial braking range, i.e. outside actual anti-lock control. Thus, in a step 13, it is at first determined whether or not at present an ABS standard control operation takes place. If the answer in 13 is "YES" (=J) standard control will continue. If the answer is "NO" (=N), if thus ABS control is not in operation and if, according to branch point 14, there is indeed a braking operation (partial braking: ja=YES) the further process of decision will depend on whether or not a cornering situation was identified (15: YES). Now it must be found out whether or not (branch point 16) a predetermined threshold value of the slip difference SD was exceeded. This operation, or rather this threshold value, will be explained in more detail with reference to FIG. 3 in the following.

If the threshold was exceeded a strong braking pressure reduction will be brought about on the wheels on the inside of the curve or only on the front wheel on the inside of the curve. This will be done via the "YES"-output of the decision point 16. This operation is symbolized by reference numeral 17 in FIG. 2.

If the threshold was not exceeded (16: N) the further program run will depend, in accordance with decision point 18, on whether or not there has already been a braking pressure reduction by means of a special control mode. In case of "NO" (output N of branch point 18), the program run will lead back to the starting point. In case of "YES", and if (branch point 19) there is again a drop (output: J=YES) below a value: "threshold minus hysteresis", the special control mode will be terminated as symbolized by operation 20 because the need for special control implied by cornering has practically come to an end.

If the answer to question 19 is "NO" the braking pressure manipulation will be performed in functional block 21 in the same manner as in step 17 (operator 17): The braking pressure will be reduced on the front wheel on the inside of the curve or on the two wheels on the inside of the curve. Special control for the improvement of driving stability will be continued.

Thus, as explained with reference to the flow chart of FIG. 2, a partial braking operation outside ABS control is a prerequisite of the inventive braking pressure manipulation on the wheel on the inside of the curve. Of decisive importance is the difference threshold which, according to FIG. 3, varies in dependence on the vehicle speed or on the reference speed of the vehicle. This difference value SD represents the difference between the wheel speed sums per side, "slip sums" for short, formed by adding up the speeds of the two wheels of one vehicle side. Expressed in a formula, this means:

$$SD = |(V_{VL}+V_{HL})-(V_{VR}+V_{HR})|$$

The indices VL, VR of this formula denominate the left and right front wheels, the indices HL and HR denominating the left and right rear wheels. Consequently, $(V_{VL}+V_{HL})$ is the speed sum of the left wheels, $(V_{VR}+V_{HR})$ being the speed sum of the right wheels of the vehicle. The absolute value of the difference formed from these two sums provides the difference value SD.

Figure 3:
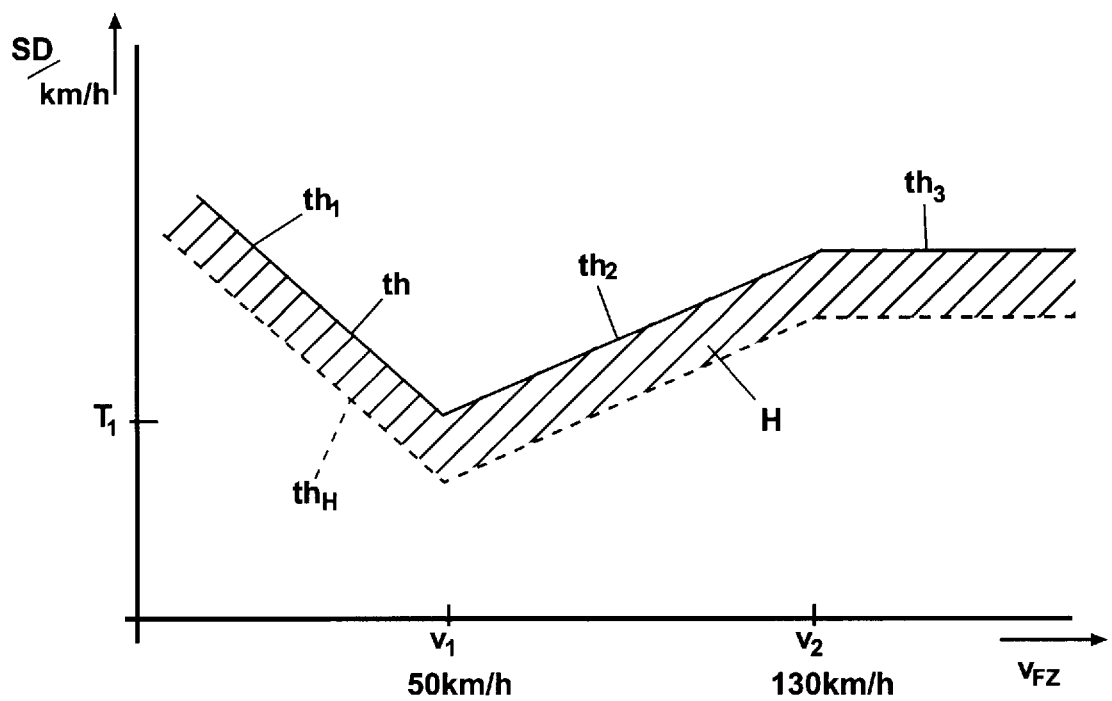
FIG. 3 is a graph of the difference threshold value in dependence on the (reference) speed of the vehicle.

FIG. 3 illustrates the variation of the difference threshold value $th=f(V_{FZ})$ in dependence of the (reference) speed of the vehicle. The threshold value variation depends on the vehicle speed, with the illustrated example referring to a modern upper-class or medium-class motor car with front wheel drive or rear wheel drive. It is also possible that, depending on the chassis construction, another variation, a shift in the characteristic lines or another dependency on the vehicle speed may prove expedient.

In the present case, the difference threshold $th=f(V_{FZ})$ decreases approximately linearly ($th_1$) in the lower speed range, i.e. up to a vehicle speed of approximately 50 k.p.h.

In a medium speed range, which here lies between 50 k.p.h. and 130 k.p.h. and thus is of special importance for the steerability and stability of the vehicle or for the driving stability, the threshold value increases approximately linearly with gradient $th_2$. Above the upper speed threshold of 130 k.p.h. of this example there follows an almost constant course of the threshold value.

As long as the difference lies below the characteristic line $th=f(V_{FZ})$ anti-lock control will not influence the braking pressure variation on the wheels on the inside of the curve in the partial braking range, i.e. as long as the actual ABS response thresholds are not reached. If, however, slip difference SD exceeds the threshold value $th; th_1, th_2, th_3$ pressure reduction will come on immediately on the front wheel and/or rear wheel on the inside of the curve as already explained with reference to the flow chart of FIG. 2. This pressure reduction then will last until the difference value SD on the observed wheel will pass and again drop below the threshold value $th; th_1, th_2, th_3$ and, in addition, pass and drop below the hysteresis band H. The special control of this invention will be stopped and the stabilization mode will be left after the drop below the hysteresis band or rather below the characteristic line $th_H$ illustrated in FIG. 3 by a broken line. In many cases it will be sufficient and expedient to bring about the required pressure reduction by means of one sole pressure reduction pulse of 20 to 50 msecs, typically of 30 msecs. An excessive pressure reduction which would imply a new pressure build-up should be avoided on principle.

The variation of the difference threshold value $th=f(V_{FZ})$ shown in FIG. 3 can be represented in mathematical terms by the linear functions of $$th_1 = k_1(V_1 - V_{FZ}) + T_0$$

$$th_2 = k_2(V_{FZ} - V_1) + T_1$$

$$th_3 = k_3$$

with e.g.

$V_1$=40 to 60 k.p.h.

$T_1$=8 to 10 k.p.h.

In practice, empirical methods enable an even more accurate adjustment of the threshold value curve to the desired variation.

What is claimed is:

1. A method of improving the control behavior of an ABS control system for a four-wheel, two-axle vehicle, comprising the steps of:

measuring individual wheel speeds;

deriving a reference speed of the vehicle;

obtaining criteria for identifying a cornering situation and the direction of the curve from the rotational behavior of the vehicle wheels, applying a special control mode causing a reduction of the braking pressure on at least one of the curve-inner wheels in a partial-braking range, with a threshold value of the wheel speed difference being exceeded, which difference is the difference between the wheel speed sums per side formed from the speeds of the two wheels of each side of the vehicle; and maintaining the special control mode until there is a drop below the threshold value and below hysteresis band (H)

wherein the hysteresis band lies in the order of magnitude of approximately 2–6 k.p.h., in particular of 3–4 k.p.h.

2. A method as claimed in claim 1, wherein the threshold value of the wheel speed difference is varied in dependence on the vehicle, speed.

3. A method of improving the control behavior of an ABS control system for a four-wheel, two-axle vehicle comprising the steps of:

measuring individual wheel speeds;

deriving a reference speed of the vehicle;

obtaining criteria for identifying a cornering situation and the direction of the curve from the rotational behavior of the vehicle wheels;

applying a special control mode when a cornering situation is identified, said special control mode causing a reduction of the braking pressure on at least one of the curve-inner wheels in a partial-braking range, with a threshold value of the wheel speed difference being exceeded which difference is the difference between the wheel speed sums per side formed from the speeds of the two wheels of each side of the vehicle; and maintaining the special control mode until there is a drop below the threshold value and below a hysteresis band (H), wherein the threshold value is varied in dependence on the vehicle reference steed, by decreasing approximately linearly with the vehicle speed in a lower range, increasing approximately linearly with the vehicle speed in a medium speed range and being approximately constant in an upper speed range.

4. A method as claimed in claim 3, wherein the lower speed range reaches as far as a vehicle speed value between approximately 40–60 k.p.h., the medium speed range reaches as far as a value between approximately 110 and 150 k.p.h., for instance, as far as approximately 130 k.p.h., which then is followed by the upper speed range.

5. A method as claimed in claim 3, wherein the hysteresis band lies in the order of magnitude of approximately 2–6 k.p.h., in particular of 3–4 k.p.h.

* * * * *